(12) United States Patent
Ledermann et al.

(10) Patent No.: US 8,389,927 B2
(45) Date of Patent: Mar. 5, 2013

(54) OPTICAL ARRANGEMENT AND ITS USE

(75) Inventors: Alexandra Ledermann, Karlsruhe (DE); Georg Von Freymann, Karlsruhe (DE); Martin Wegener, Karlsruhe (DE)

(73) Assignee: Karlsruher Institut Fuer Technologie, Karlsruhe (DE)

( * ) Notice: Subject to any disclaimer, the term of this patent is extended or adjusted under 35 U.S.C. 154(b) by 401 days.

(21) Appl. No.: 12/665,157

(22) PCT Filed: Jun. 12, 2008

(86) PCT No.: PCT/EP2008/004705
§ 371 (c)(1),
(2), (4) Date: May 28, 2010

(87) PCT Pub. No.: WO2009/006976
PCT Pub. Date: Jan. 15, 2009

(65) Prior Publication Data
US 2011/0192965 A1    Aug. 11, 2011

(30) Foreign Application Priority Data
Jul. 11, 2007  (DE) .......................... 10 2007 032 181

(51) Int. Cl.
*H01S 1/00*    (2006.01)
*H01S 3/00*    (2006.01)
*H05H 3/02*    (2006.01)

(52) U.S. Cl. ........ 250/251; 359/618; 359/641; 359/710; 359/718; 430/5; 430/30; 430/321; 430/323

(58) Field of Classification Search ................. 250/251; 359/618, 641, 710, 718; 430/5, 30, 321, 430/323
See application file for complete search history.

(56) References Cited

U.S. PATENT DOCUMENTS
6,410,213 B1 *  6/2002  Raguin et al. ................. 430/321
(Continued)

FOREIGN PATENT DOCUMENTS
DE    102004013886 A1    10/2005
DE    102005009188 A1    9/2006

OTHER PUBLICATIONS
International Search Report for PCT/EP2008/004705 mailed on Sep. 3, 2009.
(Continued)

*Primary Examiner* — Jack Berman
*Assistant Examiner* — Meenakshi Sahu
(74) *Attorney, Agent, or Firm* — Leydig, Voit & Mayer Ltd.

(57) ABSTRACT

An optical arrangement has a laser configured to emit a laser beam, an amplitude mask and a focusing element. The amplitude mask is disposed between the laser and the focusing element in a path of the laser beam such that the laser beam hits the amplitude mask before being modified by the focusing element so as to direct the laser beam to a focal point within a photosensitive material.

10 Claims, 4 Drawing Sheets

U.S. PATENT DOCUMENTS

| | | |
|---|---|---|
| 6,618,174 B2 | 9/2003 | Parker et al. |
| 6,911,959 B1 | 6/2005 | Morrish |
| 7,561,253 B2 | 7/2009 | Scharnweber |
| 7,585,596 B1 * | 9/2009 | Johnson et al. .................. 430/5 |
| 2004/0004176 A1 | 1/2004 | Liang |
| 2005/0046818 A1 | 3/2005 | Neil et al. |
| 2006/0028728 A1 | 2/2006 | Li |
| 2006/0171846 A1 | 8/2006 | Marr et al. |
| 2006/0214106 A1 | 9/2006 | Wolleschensky et al. |
| 2008/0121790 A1 * | 5/2008 | Grier ............................ 250/251 |
| 2008/0311526 A1 | 12/2008 | Scharnweber |
| 2010/0173250 A1 | 7/2010 | Scharnweber |

OTHER PUBLICATIONS

Kawata et al., Nature 412, pp. 6976-698, 2001.
Martnez-Corral et al., Optics Express, 11, pp. 1740-1745, 2003.
Ibáñez-López et al., Optics Express, 13, pp. 6168-6174, 2005.

* cited by examiner

OPTICAL ARRANGEMENT AND ITS USE

CROSS REFERENCE TO PRIOR APPLICATION

This is a U.S. national phase application under 35 U.S.C. § 371 of International Patent Application No. PCT/EP2008/054705, filed Jun. 12, 2008, and claims benefit of German Patent Application No. 10 2007 032 181.5, filed Jul. 11, 2007. The International Application was published in German on Jan. 15, 2009 as WO 2009/006976 A1 under PCT Article 21(2).

FIELD

The present invention relates to an optical arrangement and its use.

BACKGROUND

Focused laser beams are used for locally treating or processing materials. In this connection, what is it is particularly important in the processing of a material is the spatial distribution of the light intensity in the focus of the laser beam. This spatial distribution may be described by iso-intensity surfaces, also referred to as isophotes. The shape and size of the isophotes are determined by the focusing optics and the indices of optical refraction of the materials to be irradiated, and usually they have the shape of an ellipsoid of revolution whose longest axis points in an axial direction with respect to the path of the laser beam.

When a laser beam is focused into a material that is transparent to the wavelength used, the light intensity within a small volume at the focus of the laser beam may exceed the material-specific threshold for multi-photon absorption. The volume within which this absorption takes place is defined by the profile of the isophotes. Local absorption in this volume may cause physical or chemical changes which, for example, in the case of irradiation of photoresists, results in selective chemical solubility in subsequent treatment steps.

In Nature 412, pp. 6976-698 (2001), S. Kawata, H. B. Sun, T. Tanaka and K. Takada describe what is known as "direct laser writing". In this technique, a photosensitive material is irradiated by a laser whose frequency is below the single-photon polymerization threshold of the photosensitive material. When this laser is focused into the material, the light intensity within a small volume located at the focus and defined by isophotes may exceed the threshold for multi-photon polymerization. Here, too, this volume typically has the shape of an ellipsoid of revolution whose longest axis points in an axial direction. This type of irradiation produces physical or chemical changes in the material exposed to the laser beam.

M. Martinez-Corral, C. Ibáñez-López, G. Saavedra and M. T. Caballero, Optics Express, 11, pp. 1740-45 (2003) and C. Ibáñez-López, G. Saavedra, G. Boyer and M. Martínez-Corral, Optics Express, 13, pp. 6168-6174 (2005), describe amplitude masks which include a ring having lower transmission than the regions surrounding the ring and which may be used in microscopy, in particular, two-photon scanning microscopy, fluorescence microscopy, and confocal microscopy. Here, the amplitude masks are used to improve resolution during passive collection of light.

U.S. Patent Publications US 2006/0171846 A1, US 2005/0046818 A1 and U.S. Pat. No. 6,618,174 B2 all describe optical arrangements which serve as spatial filters and include a laser. A focusing element is placed between the laser and an amplitude mask in the path of the laser beam emerging from the laser in such a manner that the laser beam is first focused in the focusing element before it then hits the amplitude mask. Consequently, the amplitude mask is not in the collimated beam emerging from the laser.

German Patent Application DE 10 2004 013 886 A1 describes an optical arrangement which includes a laser and is used as a projection mask. Here, too, a focusing element is placed between the laser and an amplitude mask in the path of the laser beam emerging from the laser in such a manner that the laser beam is first focused in the focusing element before it hits the amplitude mask and, thus, the amplitude mask is not in the collimated beam emerging from the laser.

German Patent Application DE 10 2005 009 188 A1 describes an optical arrangement including a laser, where a first amplitude mask is placed between the laser and a focusing element in the path of the laser beam emerging from the laser, the laser beam first hitting said first amplitude mask. The first amplitude mask is used to influence the amplitude of the beam profile at a beam splitter. This beam splitter may have an annular configuration designed to minimize losses during fluorescence detection. Further, a second amplitude mask is used to additionally provide for spatial filtering, for example, to suppress disturbing diffraction orders, also at the beam splitter.

SUMMARY

It is, therefore, an aspect of the present invention to provide an optical arrangement, which makes it possible for the isophotes in a material being irradiated not to have a predominant direction in space, so that the isophotes exhibit a relatively spherical shape.

In an embodiment, the present invention provides an optical arrangement. The optical arrangement includes a laser configured to emit a laser beam, an amplitude mask and a focusing element. The amplitude mask is disposed between the laser and the focusing element in a path of the laser beam such that the laser beam hits the amplitude mask before being modified by the focusing element so as to direct the laser beam to a focal point within a photosensitive material.

BRIEF DESCRIPTION OF THE DRAWINGS

Exemplary embodiments of the present invention are described in more detail below with reference to following drawings. In the drawings.

DETAILED DESCRIPTION

Figure 1:
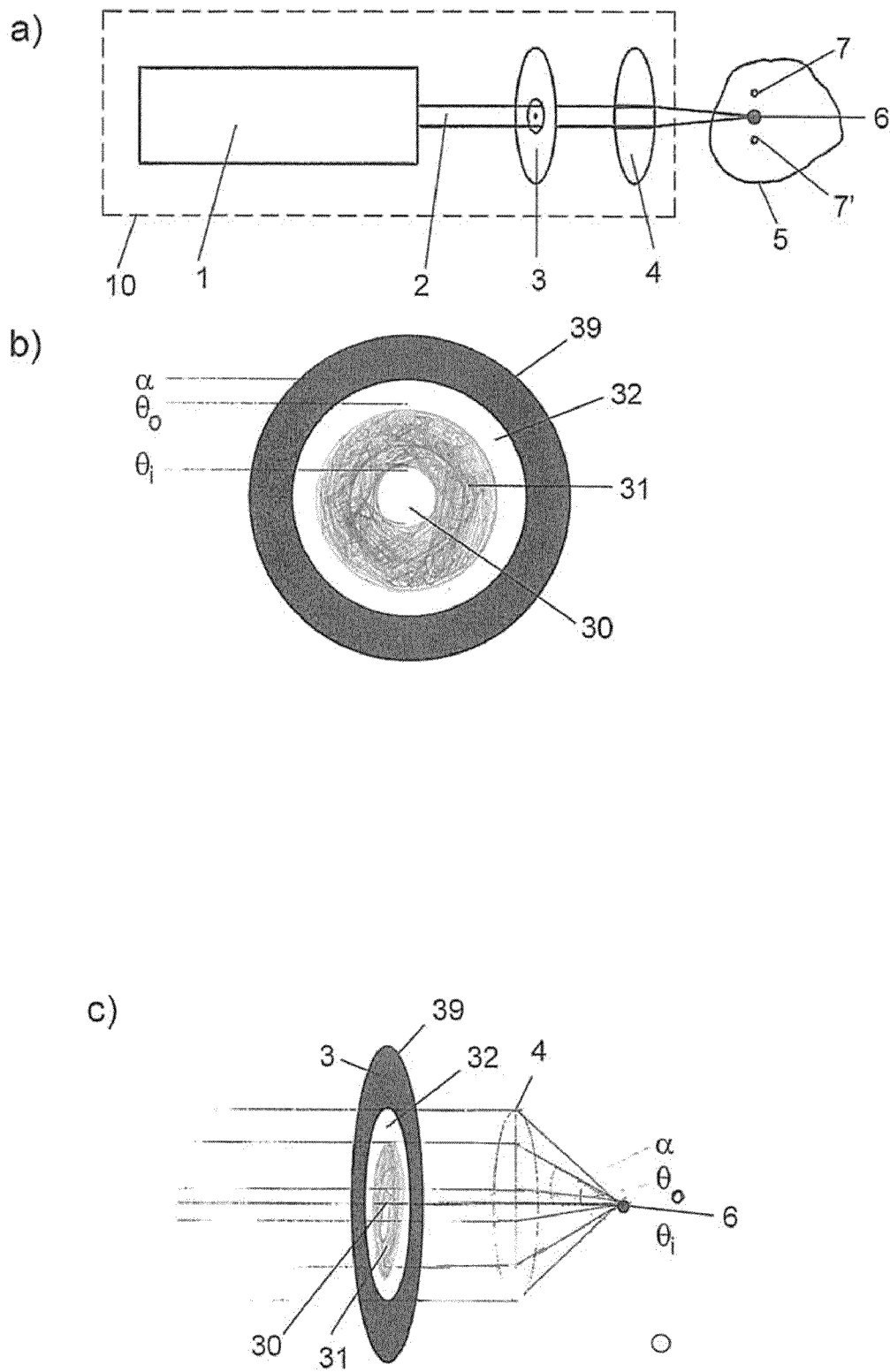
FIG. 1 is a schematic view showing the design of an optical arrangement (a) and of the amplitude mask (b) and (c)

An arrangement according to the present invention includes a laser, an amplitude mask, and a focusing element, said amplitude mask and said focusing element being located in the optical path of the laser light emerging from the laser, and the arrangement being configured such that the laser beam first hits the amplitude mask before it is then focused in the focusing element. In an embodiment, the amplitude mask is arranged concentrically with respect to the optical axis of the laser beam.

In accordance with the present invention, the amplitude mask is designed to have at least one region formed by preferably one, two, three or more rings arranged concentrically around the axis of the amplitude mask. The transmission within this region can be lower than the transmission in the areas of the amplitude mask that are outside of this region. This condition may be dispensed with for those amplitude mask areas which form the edge of the amplitude mask and are located outside of the mask area upon which the laser beam may impinge. Thus, the intensity of the light transmitted through the amplitude mask may be locally varied in a continuous manner between 0% and 100% of the incident light.

In one specific embodiment, the optical arrangement includes an amplitude plate, in which the ring or rings each have a transmission between 0% and 60%, and the areas of the amplitude mask that are outside of the ring or rings have a transmission between 80% and 100%.

In a preferred embodiment, the optical arrangement includes exactly one ring, which has a transmission between 0% and 60%, an inner angle of aperture $\theta_i$ of between 1° and 25°, and an outer angle of aperture $\theta_o$ of between 60° and a maximum possible angle of aperture which is dependent on the size of the amplitude plate. The angles of aperture characterize the amplitude mask with respect to the entrance pupil of the focusing element used and the angle of aperture $\alpha$, as seen from the focus, respectively.

The parameters mentioned for the amplitude mask of exactly one ring are selected such that the axial elongation of the isophotes is significantly reduced compared to the lateral extent, while, at the same time, the intensity in the occurring secondary maxima of the isophotes is kept low compared to the principal maximum and, at the same time, the decrease in the absolute intensity of the principal maximum is minimized compared to the intensity without the amplitude mask.

For amplitude masks including several rings, the axial extent of the isophotes is further reduced compared to the lateral extent, and the intensity in the secondary maxima of the isophotes relative to the principal maximum may be significantly increased, depending on the selection of the parameters.

In contrast to microscopy, the amplitude masks employed in the present invention are not used to improve resolution during passive collection of light, but to adjust the intensity distribution in the focus for actively processing materials using laser light. The light path is, as it were, reversed as compared to microscopy.

In an embodiment, the amplitude mask includes a glass substrate, on which the ring or rings are deposited in the form of a metal film, preferably gold on chromium as an adhesion layer, which allows for adjustment of the transmission in the metallic regions. The metal film has a thickness of 1/100 to 1/20 of the wavelength of the laser beam. Therefore, for the range of visible light (400 nm to 800 nm), preferred layer thicknesses are between 4 nm and 40 nm.

Thus, an amplitude mask differs from a phase mask, which does not modify the amplitude but the phase of a light beam impinging thereon. In order to influence the phase of an impinging light beam, transparent materials are needed that have layer thicknesses between 1/10 and 1/2 of the wavelength of the laser beam; i.e., between 40 nm and 400 nm for visible light.

Moreover, although phase masks could also be used for manipulating the isophotes, it is preferable to use amplitude masks, because when using amplitude masks, the phase is still available as a free and independent parameter which may be used to also compensate for any spherical aberrations, chromatic aberrations, or other lens defects, whose characteristics depend at least partly on the depth of the focal point within the material, said compensation possibly being performed using additional optical components.

An arrangement according to the present invention may be used for modifying the spatial intensity distribution in the focus or a secondary maximum of the laser beam in a material, preferably in a photosensitive material, which is irradiated by the laser beam. Thus, this arrangement is suitable, in particular, for producing chemical or physical changes, ablations, microexplosions, plasmas or microcracks in the material.

Suitable materials to be irradiated are, for example, organic or inorganic photoresists, glass, tempered glass, laminated safety glass, acrylic glass (PMMA), ceramic glass, sapphire or polycarbonate (PC).

In an embodiment, the arrangement of the present invention is used for carrying out single-photon or multi-photon absorption in the focus or in a secondary maximum of the laser beam within the material.

In an embodiment, the laser is focused onto one or more boundary surfaces of adjacent materials within the material, whereby the arrangement of the present invention is used in laser welding to join two or more boundary surfaces located in the focus or in a secondary maximum of the laser beam.

In another embodiment, the arrangement of the present invention may be used for direct laser writing. According to the present invention, by placing amplitude masks in the optical path immediately before the focusing element (objective), the axial elongation is reduced compared to the lateral extent of the isophotes in the material, thereby bringing the shape of the isophotes closer to the ideal of spherical symmetry.

In addition, the use of specifically designed amplitude masks allows for shaping and enhancement of the secondary maxima of the isophotes, by which further regions in the photosensitive material are irradiated in addition to, and simultaneously with, the focus as the principal maximum. This allows, for example, multi-photon polymerization to occur in spatially separate locations in one irradiation step. This also enables parallel writing during direct laser writing.

This irradiation may be followed by a physical or chemical post-treatment of the irradiated material.

Further, the optical arrangement of the present invention may be used as a radiation source as part of an optical tweezer.

The optical arrangement of the present invention may also be used in medical applications, for example, for eye surgery, for tattoo removal, tissue ablation, vaporization, excision, and for cutting or coagulating soft tissue by endoscopy.

An amplitude mask for an arrangement according to the present invention can be made by the following procedure:

First, a transparent substrate, especially one of glass, is provided which is suitable for the wavelength of the laser light used. A material, preferably photoresist, is deposited as a planar negative mask on said substrate using a lithographic method. Subsequently, a thin layer whose local extinction at the wavelength of the laser light used can be continuously adjusted between 0% and 100% is vapor-deposited on the mask. The local extinction is obtained as the product of the extinctions of the individual vapor-deposited layers. Suitable materials for the layers include both absorbent and reflective materials, such as metal films.

After removing the mask that has been deposited on the substrate, the thin layer remains as a positive on the substrate (lift-off method). This positive constitutes the desired amplitude mask.

FIG. 1a) schematically shows the configuration of an arrangement 10 according to the present invention, and its use for modifying the spatial intensity distribution of a focused laser beam in a photosensitive material 5. A laser beam 2 emerges from a laser 1, an amplitude mask 3 being placed between laser 1 and a focusing element 4 in the path of said laser beam.

In an embodiment, laser beam 2, which has been modified by focusing element 4, forms a focus 6 in a photosensitive material 5 and, depending on the characteristics of amplitude mask 3 used and focusing element 4, additionally forms two, or possibly more, secondary maxima 7, 7'.

FIG. 1b) schematically shows a concentrically designed amplitude mask 3 having a single ring 31. Located at the center of amplitude mask 3 is a first region 30, which is surrounded by single ring 31. Located outside of ring 31 is a further region 32 which, similar to region 30, has a higher transmission for the laser radiation than ring 31. Edge 39 of amplitude mask 3, which is located outside of laser beam 2, may have any transmission value between 0% and 100%.

FIG. 1c) is a further schematic view of the concentrically designed amplitude mask 3 and single ring 31 of FIG. 1b). Inner angle of aperture $\theta_i$ and outer angle of aperture $\theta_o$ characterize amplitude mask 3 with respect to the entrance pupil of the focusing element 4 and angle of aperture $\alpha$.

Figure 2:
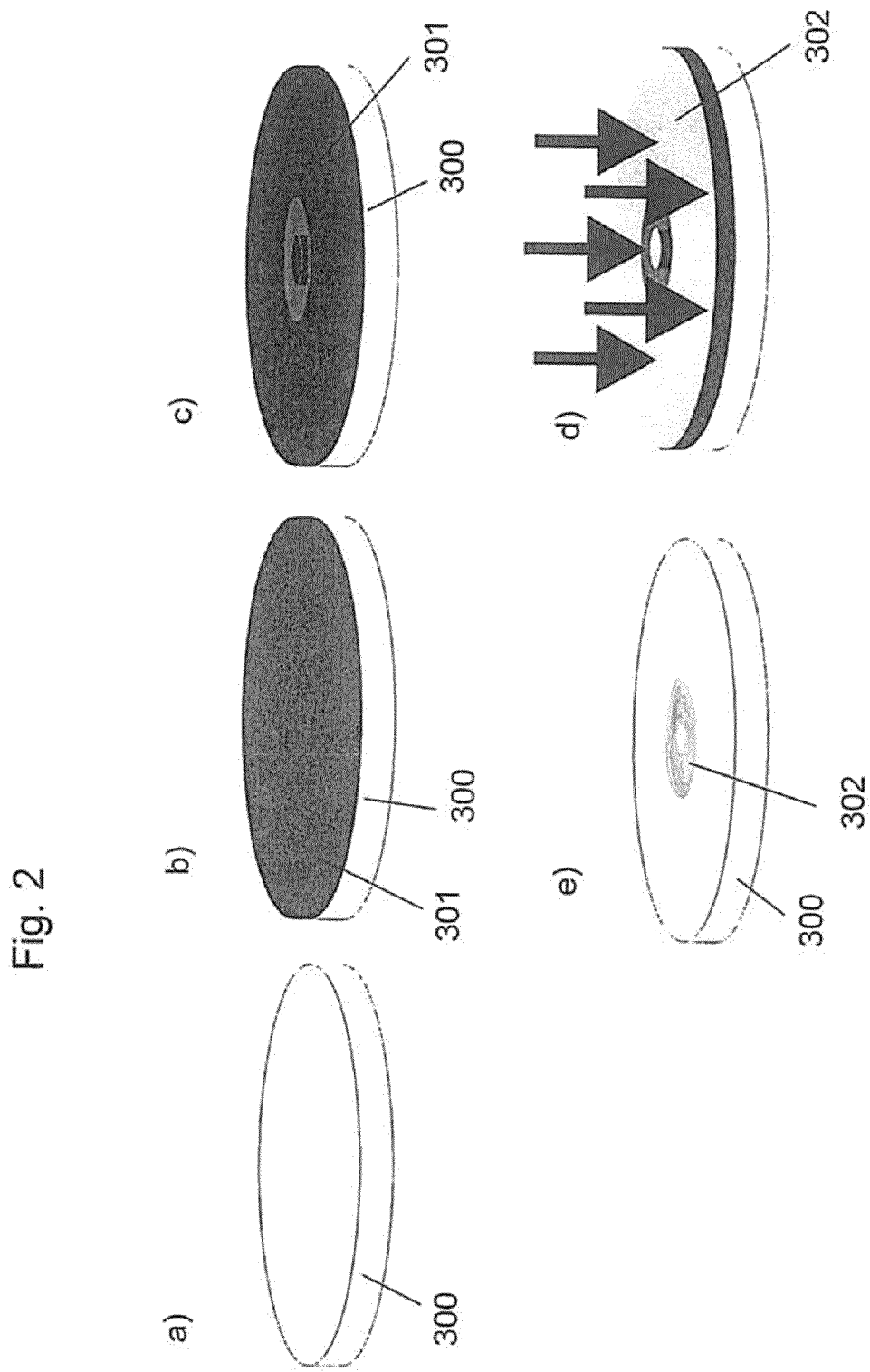
FIG. 2 is a schematic view illustrating a preferred method for manufacturing an amplitude mask (a) through (e)

FIG. 2 schematically illustrates a method suitable for manufacturing an amplitude mask 3. FIG. 2a) shows the provision of a transparent substrate 300 which is suitable for the wavelength of the laser light used and on which is deposited a first layer 301 of a material, preferably photoresist, as indicated in FIG. 2b). Subsequently, a planar negative mask of the amplitude mask 3 to be provided is produced on said substrate as indicated in FIG. 2c).

FIG. 2d) shows that a thin second layer 302 of chromium, which serves as an adhesion promoter, and gold is subsequently vapor-deposited on mask 301. The local extinction of said second layer at the wavelength of the laser light used can be continuously adjusted between 0% and 100%. After removing first layer 301 (mask), which has been deposited on substrate 300 as indicated in FIG. 2c), second layer 302 remains as a positive on substrate 300, as illustrated in FIG. 2e). This positive constitutes amplitude mask 3.

Figure 3:
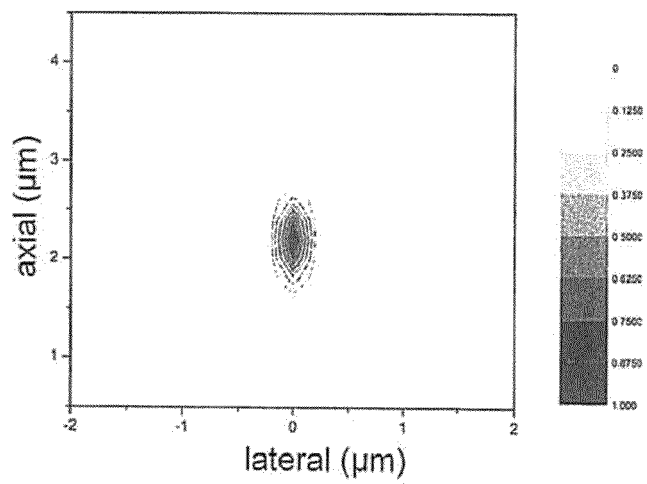
FIG. 3 is a view showing isophotes around the focal point of a laser beam focused onto a photosensitive material without using an amplitude mask (prior art)

FIG. 3 is a prior art view showing calculated isophote values (normalized) obtained when a laser beam having a wavelength of 800 nm is focused into SU-8 photoresist (refractive index n=1.589). The following parameters were assumed for the focusing element: oil immersion microscope objective having a refractive index $n_{oil}$=1.518, a numerical aperture NA=1.4, a focal length f=2 mm, and a maximum angle of aperture of $\alpha \approx 67.26°$ (from sin $\alpha$=NA/$n_{oil}$). The ellipsoid cross-section of the isophotes is clearly discernible here.

Figure 4:
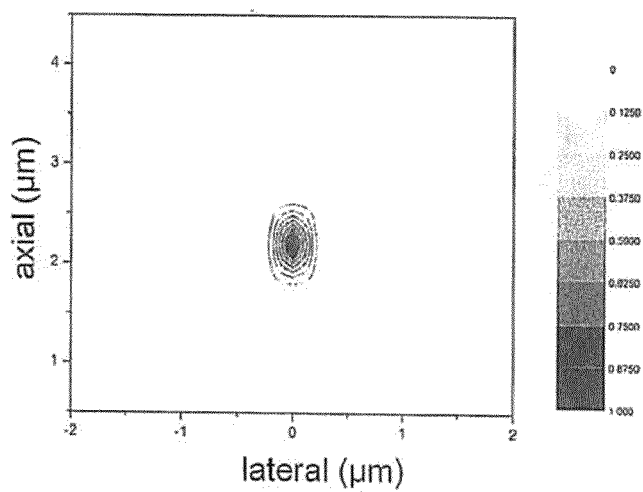
FIG. 4 is a view showing isophotes around the focal point of a laser beam which is focused onto a photosensitive material using an amplitude mask (transmission=10.21%; angle of aperture $\theta_i=12°$, $\theta_o=65.8951°$)

FIG. 4 shows (normalized) isophote values calculated using the same parameters as in FIG. 3, for the case where a first amplitude mask on a transparent glass substrate is used in accordance with an embodiment of the present invention, said first amplitude mask including a ring having a transmission=10.21% and angles of aperture $\theta_i$=12°, $\theta_o$=65.8951°. Clearly shown here is the cross-section of the isophotes, whose profile is much more spherical compared to FIG. 3.

Figure 5:
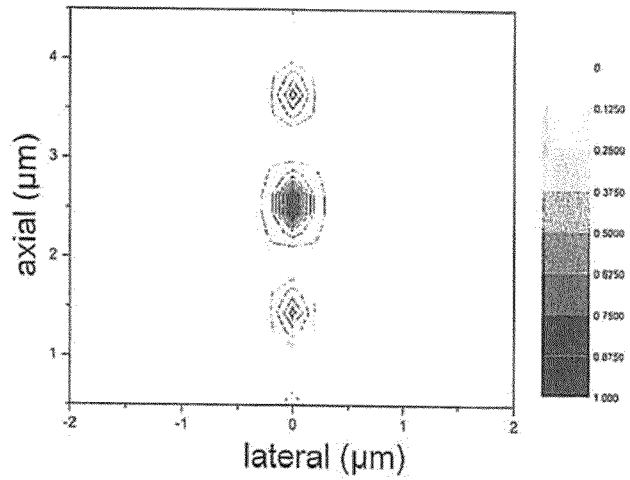
FIG. 5 is a view showing isophotes around the focal point of a laser beam which is focused onto a photosensitive material using an amplitude mask (transmission=4.21%; angle of aperture $\theta_i=23°$, $\theta_o=62.2218°$)

FIG. 5 shows (normalized) isophote values calculated using the same parameters as in FIG. 3, for the case where a second amplitude mask on a transparent glass substrate is used in accordance with another embodiment of the present invention, said second amplitude mask including a ring having a transmission=4.21% and angles of aperture $\theta_i$=23°, $\theta_o$=62.2218°. Here, too, it can be seen that the isophote profile in the focus is much more spherical compared to FIG. 3. In addition, the isophotes appearing here in the secondary maxima allow for simultaneous irradiation of three regions within the photosensitive material.

Figure 6:
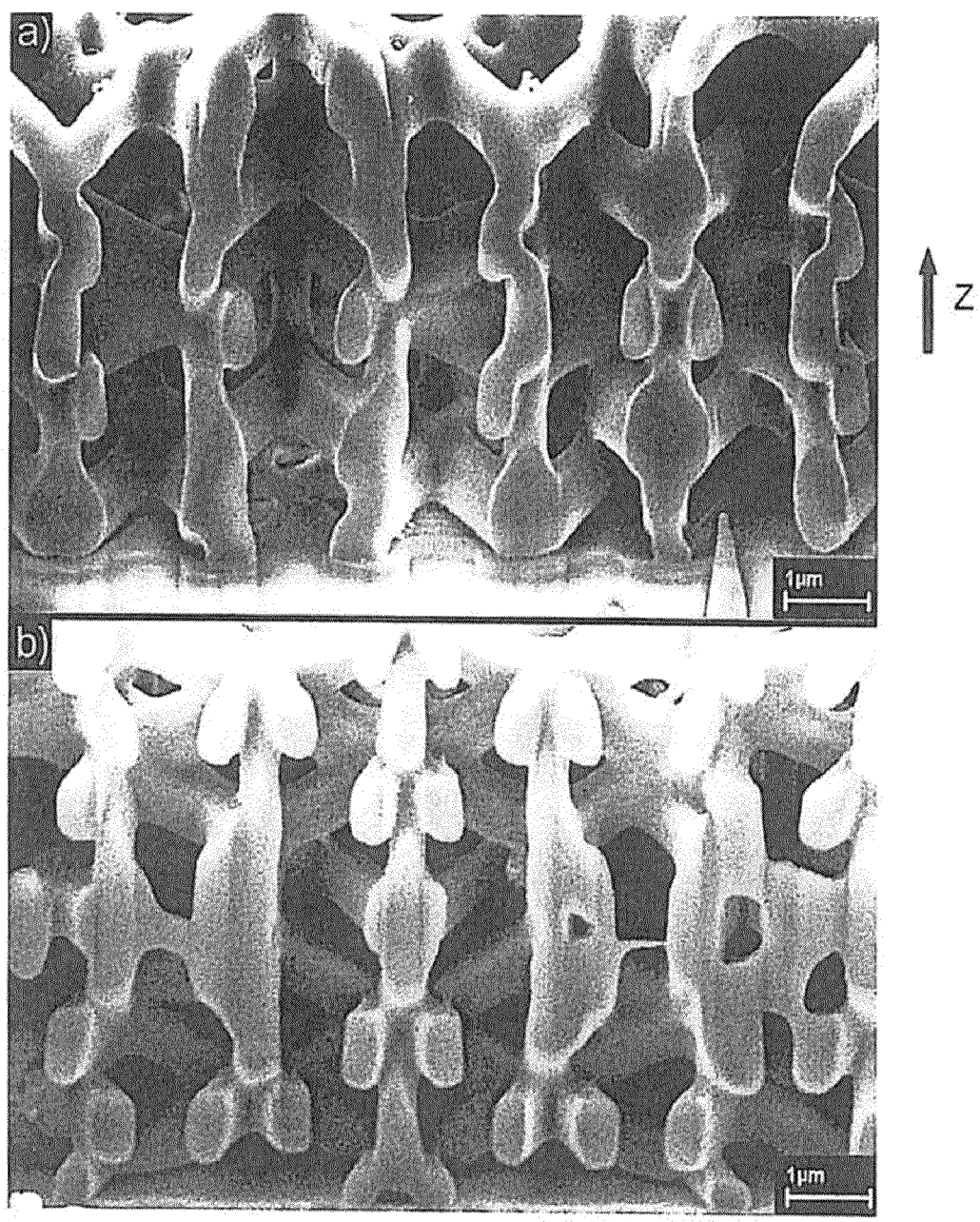
FIG. 6 depicts cross-sections through structures which have been produced by direct laser writing without using an amplitude mask (a) and using an amplitude mask (b), respectively.

FIG. 6 depicts cross-sections through structures which have been produced by direct laser writing without using the arrangement of the present invention (a) and using the arrangement of the present invention (b), respectively. The central wavelength of laser 1 used was $\lambda$=780-800 nm (variable), and the focusing element 4 used was a microscope objective having the parameters described in FIG. 3. Amplitude mask 3, in order to match the diameter of the entrance pupil of focusing element 4, included a metallic ring 31 composed of an approximately 4 nm thin film of chromium and an approximately 23 nm thin film of gold and having the angles of aperture $\theta_i$=12.00°±1,00° and $\theta_o$=65.90°±1,00°. Ring 31 had a transmission of 10%±1%. This value indicates the transmission through the region of the metallized glass substrate relative to the transmission through the surrounding glass substrate.

The structure in FIG. 6a) was made by a simple focused laser beam without using an amplitude mask. In accordance with an embodiment of the present invention, in order to produce the structure shown in FIG. 6b), an amplitude mask 3 was used which was placed in laser beam 2 immediately before the microscope objective as focusing element 4.

A comparison between FIG. 6a) and FIG. 6b) reveals that, despite the use of the amplitude mask, the photosensitive material can still be effectively irradiated, and the structures are still of high quality. The cross-section through the structures also shows that the drop-shaped cross-sectional profile of the bars is appreciably improved because in FIG. 6b, the axial elongation in the z-direction is reduced compared to the lateral extent.

While the invention has been described with reference to particular embodiments thereof, it will be understood by those having ordinary skill in the art that various changes may be made therein without departing from the scope and spirit of the invention. Further, the present invention is not limited to the embodiments described herein; reference should be made to the appended claims.

What is claimed is:
1. An optical arrangement comprising:
a laser configured to emit a laser beam,
an amplitude mask including:
  a first region including a ring arranged concentrically around an axis of the amplitude mask and having a transmission value between approximately 0% and 60%, and
  a second region outside the first region and having transmission value between approximately 80% and 100%, and
  a focusing element, the amplitude mask being disposed between the laser and the focusing element in a path of the laser beam such that the laser beam hits the amplitude mask before being modified by the focusing element so as to direct the laser beam to a focal point within a photosensitive material.

2. The optical arrangement as recited in claim 1, wherein the focusing element is configured to modify the laser beam so as to form at least two secondary maxima within the photosensitive material.

3. The optical arrangement as recited in claim 1, wherein the ring has an inner opening angle $\theta_i$ of between approximately 1° and 25° and an outer opening angle $\theta_o$ of at least approximately 60°.

4. The optical arrangement as recited in claim 1, wherein the amplitude mask is disposed concentrically with respect to an optical axis of the laser beam.

5. The optical arrangement as recited in claim 1, wherein the amplitude mask includes a glass substrate on which the ring is deposited as a metal film, the metal film having a thickness of approximately 1/100 to 1/20 of a wavelength of the laser beam.

6. The optical arrangement as recited in claim 1 wherein the optical arrangement modifies a spatial intensity distribution in a focus or in a secondary maximum of the laser beam in the photosensitive material exposed to the laser beam.

7. The optical arrangement as recited in claim 6 wherein the optical arrangement carries out single-photon or multi-photon absorption in the focus or in the secondary maximum of the laser beam in the photosensitive material.

8. The optical arrangement as recited in claim 6 wherein the optical arrangement produces at least one of a chemical change, a physical change, an ablation, a microexplosion, a plasma, and a microcrack in the photosensitive material.

9. The optical arrangement as recited in claim 6 wherein the optical arrangement joins at least two boundary surfaces of the photosensitive material located in the focus or in the secondary maximum of the laser beam.

10. The optical arrangement as recited in claim 1 wherein the optical arrangement is incorporated into an optical tweezer.

* * * * *